United States Patent
Shin et al.

(10) Patent No.: US 10,910,641 B2
(45) Date of Patent: Feb. 2, 2021

(54) POSITIVE ELECTRODE ACTIVE MATERIAL FOR SECONDARY BATTERY, AND SECONDARY BATTERY INCLUDING THE SAME

(71) Applicant: LG Chem, Ltd., Seoul (KR)

(72) Inventors: Ju Kyung Shin, Daejeon (KR); Wang Mo Jung, Daejeon (KR); Byung Chun Park, Daejeon (KR); Ji Hoon Ryu, Daejeon (KR); Sang Min Park, Daejeon (KR); Sang Wook Lee, Daejeon (KR)

(73) Assignee: LG Chem, Ltd.

( * ) Notice: Subject to any disclaimer, the term of this patent is extended or adjusted under 35 U.S.C. 154(b) by 33 days.

(21) Appl. No.: 16/541,651

(22) Filed: Aug. 15, 2019

(65) Prior Publication Data
US 2019/0372115 A1 Dec. 5, 2019

Related U.S. Application Data

(62) Division of application No. 15/574,071, filed as application No. PCT/KR2016/013951 on Nov. 30, 2016, now Pat. No. 10,439,216.

(30) Foreign Application Priority Data

Nov. 30, 2015 (KR) .......... 10-2015-0168670
Nov. 29, 2016 (KR) .......... 10-2016-0160508

(51) Int. Cl.
*H01M 4/13* (2010.01)
*H01M 4/36* (2006.01)
*H01M 4/525* (2010.01)
*H01M 4/485* (2010.01)
*H01M 4/58* (2010.01)
*H01M 10/0525* (2010.01)
*C01G 41/00* (2006.01)
*C01G 39/00* (2006.01)
*C01G 37/00* (2006.01)
*C01G 53/00* (2006.01)
*H01M 4/131* (2010.01)
*H01M 4/505* (2010.01)
*H01M 4/62* (2006.01)
*H01M 4/02* (2006.01)
*H01M 10/052* (2010.01)

(52) U.S. Cl.
CPC .......... *H01M 4/366* (2013.01); *C01G 37/006* (2013.01); *C01G 39/006* (2013.01); *C01G 41/006* (2013.01); *C01G 53/006* (2013.01); *C01G 53/50* (2013.01); *H01M 4/131* (2013.01); *H01M 4/485* (2013.01); *H01M 4/505* (2013.01); *H01M 4/525* (2013.01); *H01M 4/582* (2013.01); *H01M 4/5825* (2013.01); *H01M 4/62* (2013.01); *H01M 10/0525* (2013.01); *C01P 2004/50* (2013.01); *C01P 2004/84* (2013.01); *C01P 2004/86* (2013.01); *C01P 2006/40* (2013.01); *H01M 10/052* (2013.01); *H01M 2004/021* (2013.01); *H01M 2004/028* (2013.01)

(58) Field of Classification Search
CPC ...... H01M 4/366; H01M 4/131; H01M 4/485; H01M 4/505; H01M 4/525; H01M 4/582; H01M 4/5825; H01M 4/62; H01M 10/052; H01M 10/0525; H01M 2004/021; H01M 2004/028; C01G 37/006; C01G 39/006; C01G 41/006; C01G 53/006; C01G 53/50; C01P 2004/50; C01P 2004/84; C01P 2004/86; C01P 2006/40
See application file for complete search history.

(56) References Cited

U.S. PATENT DOCUMENTS

2004/0200998 A1  10/2004  Park et al.
2012/0104311 A1  5/2012   Levasseur et al.
2013/0277604 A1  10/2013  Shimokita et al.
(Continued)

FOREIGN PATENT DOCUMENTS

CN  103354958 A  10/2013
CN  103456916 A  12/2013
(Continued)

OTHER PUBLICATIONS

Chinese Search Report for Application No. CN 201680031453.8 dated Mar. 19, 2020, 2 pages.
(Continued)

*Primary Examiner* — Raymond Alejandro
(74) *Attorney, Agent, or Firm* — Lerner, David, Littenberg, Krumholz & Mentlik, LLP

(57) ABSTRACT

A method for positive electrode active material for a secondary battery includes preparing a precursor by reacting a nickel raw material, a cobalt raw material and an M1 raw material; forming a first surface-treated layer including an oxide of Formula 2 below, on a surface of a core including a lithium composite metal oxide of Formula 1 below, by mixing the precursor with a lithium raw material and an M3 raw material, firing the resultant mixture; and forming a second surface-treated layer including a lithium compound of Formula 3 below, on the core with the first surface-treated layer formed thereon, $Li_aNi_{1-x-y}Co_xM1_yM3_zM2_wO_2$  [Formula 1]

$Li_mM4O_{(m+n)/2}$  [Formula 2]

$Li_pM5_qA_r$  [Formula 3]

wherein, in Formulae 1 to 3, A, M1 to M5, a, x, y, z, w, m, n, p, and q are the same as those defined in the specification.

7 Claims, No Drawings

(56) References Cited

U.S. PATENT DOCUMENTS

| | | |
|---|---|---|
| 2014/0027670 A1 | 1/2014 | Sun et al. |
| 2014/0099545 A1 | 4/2014 | Cho et al. |
| 2014/0158932 A1 | 6/2014 | Sun et al. |
| 2014/0272585 A1 | 9/2014 | Kerkamm |
| 2015/0004489 A1* | 1/2015 | Song ............... C01G 45/1228 429/219 |
| 2015/0010823 A1* | 1/2015 | Yu ........................ C01D 15/04 429/223 |
| 2015/0108397 A1* | 4/2015 | Takeoka ................ C01G 53/50 252/182.1 |
| 2015/0118564 A1 | 4/2015 | Shimokita et al. |
| 2015/0171424 A1 | 6/2015 | Kawai |
| 2015/0311522 A1 | 10/2015 | Fang et al. |
| 2015/0349334 A1 | 12/2015 | Dumont et al. |
| 2016/0181593 A1 | 6/2016 | Jin et al. |
| 2016/0336595 A1 | 11/2016 | Choi et al. |
| 2017/0005333 A1 | 1/2017 | Niina et al. |
| 2017/0033354 A1* | 2/2017 | Ruan ...................... C01G 53/50 |
| 2017/0077492 A1 | 3/2017 | Higuchi et al. |

FOREIGN PATENT DOCUMENTS

| | | |
|---|---|---|
| JP | 2010040383 A | 2/2010 |
| JP | 2010055778 A | 3/2010 |
| JP | 2012069275 A | 4/2012 |
| JP | 2012138352 A | 7/2012 |
| JP | 2013239434 A | 11/2013 |
| JP | 2014506388 A | 3/2014 |
| JP | 2015111560 A | 6/2015 |
| KR | 20030083476 A | 10/2003 |
| KR | 20130138147 A | 12/2013 |
| KR | 2014-0044594 A | 4/2014 |
| KR | 20150030364 A | 3/2015 |
| KR | 20150045784 A | 4/2015 |
| KR | 2015-0090862 A | 8/2015 |
| WO | 2015026080 A1 | 2/2015 |
| WO | 2015129186 A1 | 9/2015 |
| WO | 2015141194 A1 | 9/2015 |

OTHER PUBLICATIONS

International Search Report From PCT/KR2016/013951 dated Mar. 9, 2017.

Extended European Search Report including Written Opinion for Application No. EP16871029.1 dated Apr. 3, 2018.

* cited by examiner

POSITIVE ELECTRODE ACTIVE MATERIAL FOR SECONDARY BATTERY, AND SECONDARY BATTERY INCLUDING THE SAME

CROSS-REFERENCE TO RELATED APPLICATIONS

This application is a divisional of U.S. application Ser. No. 15/574,071, filed Nov. 14, 2017, which is a national phase entry under 35 U.S.C. § 371 of International Application No. PCT/KR2016/013951, filed Nov. 30, 2016, which claims the benefits of Korean Patent Application No. 10-2015-0168670, filed, Nov. 30, 2015, and Korean Patent Application No. 10-2016-0160508, filed Nov. 29, 2016, in the Korean Intellectual Property Office, the entire contents of which are incorporated herein their entireties by reference.

TECHNICAL FIELD

The present invention relates to a positive electrode active material for a secondary battery capable of improving a battery capacity and output characteristics of a battery and reducing the generation of gas, and to a secondary battery including the same.

BACKGROUND ART

As technology development and demand for mobile devices increase, the demand for secondary batteries as energy sources is rapidly increasing. Among such secondary batteries, a lithium secondary battery having high energy density and voltage, a long cycle life, and a low self-discharge rate is commercially available and widely used.

However, the lithium secondary battery has a problem in that its service life rapidly decreases as the secondary battery is repeatedly charged and discharged. In particular, this problem becomes more serious at a higher temperature. This is a phenomenon in which an electrolyte is decomposed or an active material is deteriorated due to moisture present in the battery or other influences and the internal resistance of the battery is increased.

Accordingly, a positive electrode active material for the lithium secondary battery, which has been actively researched and developed and is used at present, is a layered $LiCoO_2$. $LiCoO_2$ is most widely used due to excellent life characteristics and charge/discharge efficiency, but $LiCoO_2$ has low structural stability so that there is a limitation in applying $LiCoO_2$ to a high capacity battery technology.

As a positive electrode active material substituting for $LiCoO_2$, various lithium transition metal oxides, such as $LiNiO_2$, $LiMnO_2$, $LiMn_2O_4$, $LiFePO_4$, and $Li(Ni_{x1}Co_{y1}Mn_{z1})O_2$, have been developed. Among them, $LiNiO_2$ has an advantage of exhibiting battery characteristics of high discharge capacity, but $LiNiO_2$ is difficult to synthesize through a simple solid phase reaction, and has a problem of low thermal stability and low cycle characteristics. Also, lithium manganese-based oxides such as $LiMnO_2$ and $LiMn_2O_4$ have advantages of being excellent in thermal stability and being inexpensive. However, the lithium manganese-based oxides have problems of small capacity and poor high-temperature characteristics. Particularly, $LiMn_2O_4$ is partially commercialized and used for low priced-goods, but has poor life characteristics due to the structural distortion (Jahn-Teller distortion) caused by $Mn^{3+}$. Further, $LiFePO_4$ has been studied for a hybrid electric vehicle (HEV) due to its low cost and good safety, but it is difficult to apply $LiFePO_4$ to other due to its low conductivity.

For this reason, a material which is most spotlighted recently as a positive electrode active material substituting for $LiCoO_2$ is a lithium nickel-manganese-cobalt oxide including excessive lithium, that is, $Li_{a1}(Ni_{x2}Co_{y2}Mn_{z2})_{2-a1}O_2$ (where the a1, x2, y2 and z2 each represent atomic fractions of independent oxide composition elements, and $1<a1\leq1.5$, $0<x2\leq1$, $0<y2\leq1$, $0<z2\leq1$, $0<x2+y2+z2\leq1$). This material has advantages of being less expensive than $LiCoO_2$ and being able to be used for high-capacity and high-voltage batteries, but is disadvantageous in that rate capability and life characteristics at a high temperature are poor.

Meanwhile, when impurities exist on the surface of a positive electrode active material during a process of producing an electrode for a lithium secondary battery, the impurities may affect aging in preparation of electrode slurry during the process of producing the lithium secondary battery. In addition, the impurities may react with the electrolytic solution introduced into the lithium secondary battery, thereby causing a swelling phenomenon in the lithium secondary battery since.

To solve such problems, various methods such as a method for coating of the surface of a positive electrode active material or a method for removing impurities from a surface of the positive electrode active material have been suggested, but these problems have not been satisfactorily solved yet.

Accordingly, it is desperately required to develop a positive electrode active material capable of solving the above problems and also improving the performance of the lithium secondary battery.

DISCLOSURE OF THE INVENTION

Technical Problem

An aspect of the present invention provides a positive electrode active material for a secondary battery capable of improving a battery capacity and output characteristics of the battery and reducing the generation of gas, and a method for preparing the same.

Another aspect of the present invention provides a positive electrode for a secondary battery including the positive electrode active material, a lithium secondary battery, a battery module, and a battery pack.

Technical Solution

According to an embodiment of the present invention, there is provided a positive electrode active material for a secondary battery, the positive electrode active material including a core including a lithium composite metal oxide of Formula 1 below, a first surface-treated layer positioned on the core, and including a lithium oxide of Formula 2 below, and a second surface-treated layer positioned on the core or the first surface-treated layer, and including a lithium compound of Formula 3 below,

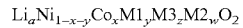  [Formula 1]

(in Formula 1, M1 is at least any one selected from the group consisting of Al and Mn, M2 is any one or at least two elements selected from the group consisting of Zr, Ti, Mg, Ta, and Nb, and M3 is any one or at least two elements selected from the group consisting of W, Mo, and Cr, and 1.0≤a≤1.5, 0<x≤0.5, 0<y≤0.5, 0.002≤z≤0.03, 0≤w≤0.02, 0<x+y≤0.7), $$Li_mM4O_{(m+n)/2} \quad \text{[Formula 2]}$$

(in Formula 2, M4 is any one or at least two elements selected from the group consisting of W, Mo, and Cr, and 2≤m≤6, and n is an oxidation number of M4), $$Li_pM5_qA_r \quad \text{[Formula 3]}$$

(in Formula 3, M5 is any one or at least two elements selected from the group consisting of elements in Group 13 to Group 15, A is any one selected from the group consisting of O, OH, CO$_3$, PO$_4$, F, and SO$_4$, and 1≤p≤10, 1≤q≤10, r=(p+s)/t where s is the absolute value of an oxidation number of M5, and t is the absolute value of an oxidation number of A).

According to another embodiment of the present invention, there is provided a method for preparing the positive electrode active material for a secondary battery, wherein the method includes preparing a precursor by reacting a nickel raw material, a cobalt raw material, and an M1 raw material (where M1 is at least any one element selected from the group consisting of Al and Mn); forming a first surface-treated layer including an oxide of Formula 2 above on a surface of the core including a lithium composite metal oxide of Formula 1 above, by mixing the precursor with the lithium raw material and the M3 raw material (where M3 is any one or at least two elements selected from the group consisting of W, Mo, and Cr), and then firing the resultant mixture; and forming a second surface-treated layer including a lithium compound of Formula 3 above, on the core with the first surface-treated layer formed thereon.

According to further another embodiment of the present invention, there is provided a positive electrode for a secondary battery, a lithium secondary battery, a battery module, and a battery pack including the positive electrode active material.

Other details of embodiments of the present invention are included in the following detailed description.

Advantageous Effects

A positive electrode active material for a secondary battery according to the present invention can improve capacity characteristics and output characteristics of the battery by forming different kinds of surface-treated layers, and reduce the generation of gas.

BEST MODE FOR CARRYING OUT THE INVENTION

Hereinafter the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A positive electrode active material for a secondary battery according to an embodiment of the present invention includes a core including a lithium composite metal oxide of Formula 1 below; a first surface-treated layer positioned on the surface of the core, and including a lithium oxide of Formula 2 below; and a second surface-treated layer positioned on the core or the first surface-treated layer, and including a lithium compound of Formula 3 below, $$Li_aNi_{1-x-y}Co_xM1_yM3_zM2_wO_2 \quad \text{[Formula 1]}$$

(in Formula 1, M1 is at least any one selected from the group consisting of Al and Mn, M2 is any one or at least two elements selected from the group consisting of Zr, Ti, Mg, Ta, and Nb, and M3 is any one or at least two elements selected from the group consisting of W, Mo and Cr, and 1.0≤a≤1.5, 0<x≤0.5, 0<y≤0.5, 0.002≤z≤0.03, 0≤w≤0.02, 0<x+y≤0.7), $$Li_mM4O_{(m+n)/2} \quad \text{[Formula 2]}$$

(in Formula 2, M4 is any one or at least two elements selected from the group consisting of W, Mo, and Cr, 2≤m≤6, and n is an oxidation number of M4), $$Li_pM5_qA_r \quad \text{[Formula 3]}$$

(in Formula 3, M5 is any one or at least two elements selected from the group consisting of elements in Group 13 to Group 15, A is any one selected from the group consisting of O, OH, CO$_3$, PO$_4$, F, and SO$_4$, and 1≤p≤10, 1≤q≤10, r=(p+s)/t where s is the absolute value of an oxidation number of M5, and t is the absolute value of an oxidation number of A).

A composition of the lithium composite metal oxide of Formula 1 above is an average composition of an entirety of the core, the lithium oxide of Formula 2 above has an average composition of an entirety of the first surface-treated layer, and the lithium compound of Formula 3 above has an average composition of an entirety of the first surface-treated layer.

Specifically, a positive electrode active material according to an embodiment of the present invention includes a core, a first surface-treated layer positioned on the core, and a second surface-treated layer positioned on the core or the first surface-treated layer.

As such the first and second surface-treated layers each having an independently optimized composition may be formed on the core in order to improve a battery performance, thereby improving the capacity characteristics of the battery. Further, the output characteristics, particularly, the output characteristics at high temperatures, may be improved by reducing the resistance and the amount of gas generated during operation of the battery may be reduced. And these surface-treated layers may prevent the direct contact between the core and an electrolytic solution to avoid the positive electrode active material from reacting with a hydrofluoric acid derived from the electrolytic solution and from being dissolved in the electrolytic solution, thereby improving the cycle characteristics when the positive electrode active material is applied to the battery. Further, as a tap density of the positive electrode active material is increased by the formation of the first and second surface-treated layers, the rolling density may be resultantly increased.

Specifically, in the positive electrode active material according to an embodiment of the present invention, the first surface-treated layer is formed on the core through the reaction between lithium and an M4 element (any one or at least two elements selected from the group consisting of W, Mo, and Cr) during a firing process for a precursor of the lithium composite metal oxide of Formula 1 in preparation of the core.

The first surface-treated layer includes an oxide composed of lithium and an M4 element, that is, the compound of Formula 2, and M4 in Formula 2 may be more specifically W or Cr.

As an example, when M4 in Formula 2 is W, the compound of Formula 2 may be $Li_2WO_4$, $Li_4WO_5$, $Li_6WO_6$, and the like, and may include any one or a mixture of at least two thereof.

Also, when M4 in Formula 2 is Mo, the compound may be $Li_2MoO_4$, $LiMoO_3$, $Li_4Mo_3O_8$, or the like, and may include any one or a mixture of at least two thereof.

Also, when M4 in Formula 2 is Cr, the compound may be $LiCrO_2$, $Li_2CrO_4$, $Li_2Cr_2OC_7$, or the like, and may include any one or a mixture of at least two thereof.

The lithium oxide of Formula 2 included in the first surface-treated layer prevents the positive electrode active material from being dissolved in the electrolytic solution by reacting with the electrolytic solution-derived hydrofluoric acid during charging and discharging. As a result, the cycle characteristics of the battery may be improved. In addition, the lithium oxide of Formula 2 may prevent a rapid decrease in capacity by suppressing oxygen gas from being generated in the battery. Also, the compound of Formula 2 may prevent deterioration of the characteristics of the second surface-treated layer by blocking cobalt included in the core from being diffused into the second surface-treated layer even while maintaining charge transfer between the core and the second surface-treated layer.

M4 included in the lithium oxide of Formula 2 may be included in an amount of 100 ppm to 20,000 ppm, based on the total weight of the positive electrode active material. When the content of M4 is less than 100 ppm, the improvement effect resulting from the formation of the surface-treated layer including the lithium oxide is insignificant; and when the content exceeds 20,000 ppm, the battery characteristics may be rather deteriorated by excessive M4.

The first surface-treated layer may be formed on the entire surface of the core, or may be partially formed.

Specifically, when the first surface-treated layer is partially formed, the first surface-treated layer may be formed to have a surface area of 25% or more to less than 100% of the entire surface area of the core. When the first surface-treated layer is formed to have an area of less than 25%, the improvement effect resulting from the formation of the first surface-treated layer is insignificant. More specifically, the first surface-treated layer may be formed to have a surface area of 25% to 99% of the core surface.

In the positive electrode active material, when the first surface-treated layer is partially formed, the first surface-treated layers locally formed on the surface of the core may be present in a plurality.

In addition, the first surface-treated layer may be formed with an appropriate thickness in consideration of a particle diameter of the core determining the capacity of the positive electrode active material. Specifically, the first surface-treated layer may be formed to have an average thickness ratio of 0.001 to 0.1 with respect to the radius of the core. When the thickness ratio of the first surface-treated layer is less than 0.001, the improvement effect resulting from formation of the first surface-treated layer may be insignificant. Also, when the thickness ratio exceeds 0.1, the resistance to lithium ions passing through the first surface-treated layer may increase.

In the present invention, the particle diameter of the core and the thickness of the first surface-treated layer may be measured through a particle cross-sectional analysis using a forced ion beam (FIB).

In the positive electrode active material according to an embodiment of the present invention, the second surface-treated layer includes the lithium compound of Formula 3 including an M5 element (M5 is any one or at least two elements selected from the group consisting of elements in Group 13, Group 14, and Group 15 of the periodic table).

Specifically, in the lithium compound of Formula 3, M5 may be any one or at least two elements selected from the group consisting of B, Si, Sn, Bi, and Ge, and more specifically, may be B, Si, or Sn.

As an example, when M5 in Formula 3 is B, the lithium compound of Formula 3 may be $LiBO_2$, $Li_2B_4O_7$, or the like, and may include any one or a mixture of at least two thereof.

When M5 in Formula 3 is Si, the lithium compound may be $Li_2SiO_3$, $Li_4SiO_4$, $Li_6SiO$, $Li_2Si_2O_5$, or the like, and may include any one or a mixture of at least two thereof.

Also, when M5 in Formula 3 is Sn, the lithium compound may be $Li_4SnO_4$, $Li_2SnO_3$, $Li_8SnO_6$, or the like, and may include any one or a mixture of at least two thereof.

Further, When M5 in Formula 3 is Bi, the lithium compound may be $LiBiO_2$, $LiBiO_3$, $Li_3BiO_3$, $Li_3BiO_4$, $Li_5BiO_5$, $Li_7BiO_6$, or the like, and may include any one or a mixture of at least two thereof.

In addition, when M5 in Formula 3 is Ge, the lithium compound may be $Li_2GeO_3$, $Li_2Ge_7O_{15}$, $Li_4Ge_5O_{12}$, $Li_4GeO_4$, or the like, and may include any one or a mixture of at least two thereof.

In the lithium compound of Formula 3, A may be any one selected from the group consisting of O, OH, $CO_3$, $PO_4$, F, and $SO_4$, and more specifically, may be O, OH, $PO_4$, or F, and further more specifically, may be O.

As an example, when A in Formula 3 is OH, the lithium compound of Formula 3 may be $LiB(OH)_4$, or the like.

Also, when A in Formula 3 is $PO_4$, the lithium compound of Formula 3 may be $LiBPO_4$, $LiSiPO_4$, or the like.

Further, when A in Formula 3 is F, the lithium compound of Formula 3 may be $LiBF_4$, $Li_2SnF_6$, or the like.

The second surface-treated layer may include the lithium compound of Formula 3 to suppress a side reaction between the electrolytic solution and the positive electrode active material, thereby improving the capacity characteristics and cycle characteristics of the battery. Such effects may also be influenced by the content of an M5 element included in the second surface-treated layer. Accordingly, M5 included in the lithium compound of Formula 3 may be included in an amount of 100 ppm to 20,000 ppm, based on the total weight of the positive electrode material. When M5 content is less than 100 ppm, the improvement effect resulting from the formation of the second surface-treated layer comprising the lithium compound is insignificant; and when the content exceeds 20,000 ppm, the battery characteristics may be rather deteriorated due to excessive M5.

The second surface-treated layer may be formed on the first surface-treated layer, or may be directly formed on the core surface because the first surface-treated layer may be partially formed on the core surface.

In addition, in a similar manner to the first surface-treated layer, the second surface-treated layer may also be formed on the entire surface of the core or the first surface-treated layer, or may be partially formed. Specifically, when the second surface-treated layer is partially formed, the surface-treated layer may be formed to have a surface area of 25% or more to less than 100% of the total surface area of the core having the first surface-treated layer formed thereon. When the second surface-treated layer is formed to have an area of less than 25%, the improvement effect resulting from the formation of the second surface-treated layer is insignificant. More specifically, the second surface-treated layer may be formed to have a surface area of 25% to 99% of the core surface.

In addition, the second surface-treated layer may be formed to have an appropriate thickness in consideration of the particle diameter of the core determining the capacity of the positive electrode active material. Specifically, the second surface-treated layer may be formed to have an average thickness ratio of 0.001 to 0.1 with respect to the radius of the core. When the thickness ratio of the second surface-treated layer is less than 0.001, the improvement effect resulting from the formation of the surface-treated layer is insignificant; and when the thickness ratio exceeds 0.1, the resistance to lithium ions passing through the second surface-treated layer may increase.

In the present invention, the particle diameter of the core and the thickness of the second surface-treated layer may be measured through a particle cross-sectional analysis using a forced ion beam (FIB).

Meanwhile, in the positive electrode active material according to an embodiment of the present invention, the core includes a polycrystalline lithium composite metal oxide of Formula 1 having the form of secondary particles obtained through an agglomeration of two or more primary particles.

In the present invention, a polycrystal means a crystal in which two or more crystal particles are agglomerated. In the present invention, the crystal particles forming the polycrystal mean primary particles, and the polycrystal means the form of secondary particles obtained through an agglomeration of such primary particles.

Specifically, in the lithium composite metal oxide of Formula 1, M3 is an element belonging to Group 6 (Group VIB) of the period table, and serves to suppress particle growth during a firing process in preparation of active material particles. In the crystal structure of the positive electrode active material, the M3 may substitute some of Ni, Co, or M1 to be present at the position where the substituted elements should be located, or may react with lithium to form a lithium oxide. Accordingly, the size of a crystal grain may be controlled by adjusting the content and input timing of M3. Specifically, the M3 may be any one or at least two elements selected from the group consisting of W, Mo, and Cr, and more specifically may be at least any one element of W and Cr. Among them, when M3 is W, M3 may be excellent in terms of improvement of output characteristics; and when M3 is Cr, M3 may be more excellent in terms of improvement of structural stability.

The M3 may be included in the lithium composite metal oxide of Formula 1 in an amount corresponding to z, that is, $0.002 \leq z \leq 0.03$. When z is less than 0.002, or exceeds 0.03, the active material satisfying the above-described characteristics is difficult to be realized, and as a result, the improvement effect of the output and life characteristics may be insignificant. Considering the implementation of the particle structure according to the content control of the M3 element and a remarkable effect of improving the battery characteristics resulting therefrom, the z may be, more specifically, $0.005 \leq z \leq 0.01$.

In addition, in the lithium composite metal oxide of Formula 1, Li may be included in an amount corresponding to a, that is, $1.0 \leq a \leq 1.5$. When a is less than 1.0, the capacity may be lowered; and when a exceeds 1.5, particles are sintered in the firing process, which makes it difficult to prepare the active material. Considering a balance between a remarkable effect of improving the capacity characteristics of the positive electrode active material according to the lithium content control and a sinterability at the time of preparing the active material, the Li may be included in an amount of, more particularly, $1.0 \leq a \leq 1.15$.

In addition, in the lithium composite metal oxide of Formula 1, Ni may be included in an amount corresponding to 1-x-y which is obtained by subtracting the sum of the content x corresponding to Co and the content y corresponding to M2 from 1, and included in an amount of, preferably, $0.3 \leq 1-x-y<1$, and more preferably, $0.35 \leq 1-x-y \leq 0.8$. When the content of Ni satisfies the above range, more excellent capacity characteristics and high temperature stability may be achieved.

In addition, in the lithium composite metal oxide of Formula 1, Co may be included in an amount corresponding to x, that is, $0<x \leq 0.5$. When x is 0, the capacity characteristics may be deteriorated; and, when x exceeds 0.5, costs may be increased. Considering a remarkable effect of improving the capacity characteristics achieved by including Co, the Co may be included in an amount of, more particularly, $0.10 \leq x \leq 0.35$.

In addition, in the lithium composite metal oxide of Formula 1, M1 may be at least any one selected from the group consisting of Al and Mn. When the M1 is Al, the average oxidation number of the active material may be maintained to improve the life characteristics of the battery. Also, when the M1 is Mn, the structural stability of the active material may be improved and the stability of the battery may be resultantly improved.

The M1 may be included in an amount corresponding to y, that is, $0<y \leq 0.5$. When y is 0, the improvement effect achieved by including M1 fail to be obtained; and when y exceeds 0.5, the capacity characteristics and output characteristics of the battery may be rather deteriorated.

Considering a remarkable effect of improving the battery characteristics achieved by including the M1 element, the M1 may be included in an amount of, more particularly, $0.1<y \leq 0.3$.

Further, the lithium composite metal oxide of Formula 1 or the elements of Ni, Co, and M1 in the lithium composite metal oxide may be partially substituted or doped with another element, that is, M2 in order to improve the battery characteristics by controlling the distribution of metal elements in the active material. The M2 may be specifically any one or at least two elements selected from the group consisting of Zr, Ti, Mg, Ta, and Nb, and more specifically, may be Ti or Mg.

The M2 element may be included in an amount corresponding to w, that is, an amount of $0 \leq w \leq 0.02$, within a range in which the characteristics of the positive electrode active material are not deteriorated.

In the core, at least any one metal element of the nickel, M1, and cobalt included in the lithium composite metal oxide of Formula 1 may exhibit a concentration gradient in which the concentration thereof increases or decreases in the core.

In the present invention, the concentration gradient or concentration profile of a metal element means a graph showing the content of the metal element versus the depth of a central portion from a particle surface, when X-axis represents the depth of the central portion from the particle surface and Y-axis represents the content of the metal element. As an example, the positive average slope of the concentration profile indicates that a relatively larger number of the corresponding metal elements are positioned in the central portion than in the surface portion of the particle, and the negative average slope indicates that a relatively larger number of metal elements are positioned in the surface portion than in the central portion of the particle. In the present invention, the concentration gradient and concentration profile of the metal in the core may be observed by using X-ray photoelectron spectroscopy (XPS), electron spectroscopy for chemical analysis (ESCA), electron probe micro analyzer (EPMA), inductively coupled plasma—atomic emission spectrometer (ICP-AES), time of flight secondary ion mass spectrometry (ToF-SIMS), or the like. Specifically, when the profile of the metal element in the core is observed by using XPS, an atomic ratio of metals is measured by each etching time while the active material is etched from the particle surface toward the central portion, and the concentration profile of the metal element may be observed the measured results.

Specifically, at least one metal element of the nickel, cobalt, and M1 may have a concentration gradient in which the concentration of the metal gradually changes over the entirety of the core particle, and the slope of the concentration gradient of the metal element may represent one or more values. Such a gentle concentration gradient provides a smooth phase boundary region from the center to the surface, so that the crystal structure is stabilized and thermal stability is increased. In addition, when the slope of the concentration gradient of a metal is constant, the improvement effect of structural stability may be further improved. Also, the concentration of each metal in the active material particle is changed through the concentration gradient, whereby the corresponding metal properties may be easily utilized to further increase the improvement effect of the positive electrode active material on the battery performance.

In the present invention, the wording "to exhibit a concentration gradient in which the concentration of the metal gradually changes" means that the concentration of the metal does not suddenly changes over the entire particles, that is, there is no abrupt concentration difference, and the metal is thus present in a concentration distribution in which the concentration changes gradually or continuously. Specifically, the concentration distribution may have a difference in concentration such that a change in metal concentration per 1 μm, and more specifically per 0.1 μm, in the particle is 0.1 atom % to 30 atom %, more specifically 0.1 atom % to 20 atom %, and further more specifically 1 atom % to atom %, based on the total atomic weight of the corresponding metal included in a precursor.

More specifically, the concentration of nickel included in the core may decrease to have a gentle concentration gradient from the center of the core particle toward the surface thereof. In this case, the slope of the nickel concentration gradient may be constant from the center of the core particle to the surface thereof. As described above, when the nickel maintains its high concentration at the center of the core and has a concentration gradient in which the concentration thereof gradually decreases toward the core surface side, the thermal stability of the positive electrode active material may be improved.

In addition, the concentration of the M1 included in the core may increase to have a gentle concentration gradient from the center of the core particle toward the surface thereof. In this case, the slope of the M1 concentration gradient may be constant from the center of the core particle to the surface thereof. As described above, when the M1, particularly manganese, maintains its low concentration at the center of the core particle and has a concentration gradient in which the concentration thereof increases toward the core surface side, the thermal stability may be improved without reducing the capacity of the positive electrode active material. More specifically, the M1 may be Mn.

In addition, the concentration of the cobalt included in the core may increase to have a gentle concentration gradient from the center of the core particle toward the surface of the particle. In this case, the slope of the cobalt concentration gradient may be constant from the center of the particle to the surface thereof. As described above, when the cobalt maintains its low concentration at the center of the core and has a concentration gradient in which the concentration thereof increases toward the surface side, the capacity characteristics of the positive electrode active material may be improved while reducing the amount of cobalt used.

In addition, the nickel, M1, and cobalt each exhibits a concentration gradient independently changing over the entirety of the core particle, and the nickel may have a gentle concentration gradient in which the nickel concentration decreases from the center of the core toward the surface thereof, and the cobalt and M1 each may have a gentle concentration gradient in which the cobalt and M1 concentration independently increases from the center of the core toward the surface thereof. As described above, thermal stability may be improved while maintaining the capacity characteristics of the positive electrode active material, by including a combined concentration gradient in which the concentration of the nickel decreases and the concentrations of the cobalt and M1 increase toward the surface side of the core over the entire core.

Further, in the positive electrode active material according to an embodiment of the present invention, M4 element in the lithium oxide of Formula 2 may be doped into the core. In this case, M4 element may have a concentration gradient in which the M4 concentration decreases from the surface of the core toward the inside thereof.

As described above, when M4 is doped into the lithium composite metal oxide inside the core, output characteristics may be further improved by controlling the distribution of metal elements in the lithium composite metal oxide. Also, the M4 may have a concentration gradient to reduce the concentration difference from M4 included in the first surface-treated layer, thereby improving the structural stability of the active material and the resulting life characteristics.

In addition, in the positive electrode active material according to an embodiment of the present invention, the core composed of secondary particles obtained through agglomeration of primary particles may exhibit excellent output characteristics. Also, the core may have a crystal particle size optimized to exhibit high output characteristics through control of the content of M3 element included in the lithium composite metal oxide and the firing conditions in preparation of the core.

Specifically, the average crystal size of the primary particles forming a polycrystalline lithium composite metal oxide is 50 nm to 200 nm, and considering a remarkable effect of improving output characteristics resulting from a crystal size control, the average crystal size of the primary particles may be more specifically 80 nm to 120 nm.

In the present invention, an average crystal size may be quantitatively analyzed by using the X-ray diffraction analysis of the lithium composite metal oxide particles. For example, the average crystal size of the primary particles may be quantitatively analyzed by placing the polycrystalline lithium composite metal oxide into a holder and analyzing a diffraction grating obtained by irradiating the particles with X-rays.

In addition, the core in a secondary particle phase in which the primary particles are agglomerated may have an average particle diameter ($D_{50}$) of 2 μm to 20 μm. When the average particle diameter of the secondary particle is less than 2 μm, the stability of the polycrystalline lithium composite metal oxide may be deteriorated, and when the diameter exceeds 20 μm, the output characteristics of the secondary battery may be deteriorated. The positive electrode active material according to the present invention may meet both the crystal grain size of the primary particle and the average particle diameter of the secondary particle simultaneously, thereby exhibiting excellent structural stability and further improved output characteristics when used for the battery. Also, considering the remarkable improvement effect resulting from the simultaneous control of both the crystal grain size of the primary particle and the average particle diameter of the secondary particle, the average crystal size of the primary particle may be 80 nm to 120 nm and the average particle diameter of the secondary particles may be 3 μm to 15 μm.

In the present invention, the average particle diameter ($D_{50}$) of the core may be defined as a particle diameter at 50% in the particle diameter distribution. In the present invention, the average particle diameter ($D_{50}$) of the core may be measured, for example, by using an electron microscopic observation through a scanning electron microscopy (SEM), a field emission scanning electron microscopy (FE-SEM), or the like, or by using a laser diffraction method. When measured by the laser diffraction method, more specifically, the average particle diameter ($D_{50}$) at 50% in the particle size distribution may be calculated in the measuring apparatus by dispersing the core in a dispersion medium, then introducing into a commercially available laser diffraction particle size analyzer (for example, Microtrac MT 3000), and then irradiating with an ultrasonic wave of about 28 kHz at a power of 60 W.

Further, in the positive electrode active material according to an embodiment of the present invention, the core may have a particle size distribution value (Dcnt) which is defined by following Equation 2 and is in the range of 0.5 to 1.0, more specifically 0.55 to 0.9. When the particle size distribution value of the core is less than 0.5, the preparation of a high-density electrode may be difficult, and when exceeding 1.0, the rolling processability may be deteriorated, $$Dcnt=[Dn90-Dn10]/Dn50 \qquad \text{[Equation 2]}$$

(in Equation 2, Dn90 is a number average particle diameter measured on the basis of 90% in an absorbing mode by using the Microtrac particle size analyzer after the core is placed in distilled water and left standing for 3 hours, and Dn10 is a number average particle diameter measured on the basis of 10%, and Dn50 is a number average particle diameter measured on the basis of 50%).

The positive electrode active material according to an embodiment of the present invention having the above-described structure and configuration may have an average particle diameter ($D_{50}$) of 2 μm to 20 μm, or may have a BET specific surface area of 0.5 m$^2$/g to 1.9 m$^2$/g.

When the average particle diameter ($D_{50}$) of the positive electrode active material is less than 2 μm, or the BET specific surface area exceeds 1.9 m$^2$/g, the agglomeration between the positive electrode active materials may cause the dispersibility of the positive electrode active material in an active material layer to be deteriorated and the resistance in electrodes to be increased. When the average particle diameter ($D_{50}$) exceeds 20 μm, or the BET specific surface area is less than 0.5 m$^2$/g, the dispersibility and capacity of the positive electrode active material itself may be lowered.

In addition, the positive electrode active material according to an embodiment of the present invention may satisfy both the conditions of the average particle diameter and the BET specific surface area simultaneously, thereby exhibiting excellent capacity and charge/discharge characteristics. More specifically, the positive electrode active material may have an average particle diameter ($D_{50}$) of 3 μm to 15 μm and a BET specific surface area of 1.0 m$^2$/g to 1.5 m$^2$/g.

In the present invention, the average particle diameter ($D_{50}$) of the positive electrode active material may be defined and measured in the same manner as in the measurement of the average particle diameter of the core. In the present invention, the specific surface area of the positive electrode active material is measured by the Brunauer-Emmett-Teller (BET) method, and specifically, the specific surface area may be calculated from an amount of nitrogen gas adsorbed at a liquid nitrogen temperature (77K) by using BELSORP-mino II (manufactured by BEL Japan Inc.).

In addition, the positive electrode active material according to an embodiment of the present invention may have a tap density of 1.7 g/cc or more, or 1.7 g/cc to 2.5 g/cc. High capacity characteristics may be exhibited by having a high tap density in the above range. In the present invention, the tap density of the positive electrode active material may be measured by using a conventional tap density measuring instrument, and specifically, by using a power tester manufactured by Seishin company.

In addition, the positive electrode active material according to an embodiment of the present invention may be prepared by a method which includes: (step 1) preparing a precursor by reacting a nickel raw material, a cobalt raw material, and an M1 raw material (where M1 is at least any one element selected from the group consisting of Al and Mn); (step 2) mixing the precursor with a lithium raw material and an M3 raw material (where M3 is any one or at least two elements selected from the group consisting of W, Mo, and Cr), and then firing the resultant mixture to form a first surface-treated layer including an oxide of Formula 2 on a core including a lithium composite metal oxide of Formula 1; and (step 3) forming a second surface-treated layer including a lithium compound of Formula 3, on the core with the first surface-treated formed thereon. In this case, when the positive electrode active material further includes M2 (where M2 is any one or at least two elements selected from the group consisting of Zr, Ti, Mg, Ta, and Nb), an M2 raw material may be added when mixing the raw material of each metal element in step 1, and the M2 raw material may be added when mixing the lithium raw material in step 2. Accordingly, according to another embodiment of the present invention, there is provided a method for preparing the positive electrode active material.

Hereinafter, each step will be described in detail. In a method for preparing the positive electrode active material, step 1 is a step for preparing a precursor using a nickel raw material, a cobalt raw material, an M1 raw material, and optionally an M2 raw material.

Specifically, the precursor may be prepared through coprecipitation reaction by adding an ammonium cation-containing complex-forming agent and a basic compound into a metal-containing solution prepared by mixing a nickel raw material, a cobalt raw material, an M1 raw material, and an M2 raw material. In this case, the mixing ratio of each raw material may be appropriately determined within the range satisfying content conditions of respective metal elements in the positive electrode active material finally prepared.

The metal-containing solution may be prepared by adding each of the nickel raw material, cobalt raw material, M1-containing raw material, and optionally M2-containing raw material into a solvent, specifically water or a mixture of water and an organic solvent (specifically alcohol, etc.) uniformly mixable with water. Alternatively, a solution including each metal-containing raw material, specifically an aqueous solution may be prepared, and used by mixing each solution.

As the metal-containing raw material, acetic acid salts, nitrates, sulfates, halides, sulfides, hydroxides, oxides, oxyhydroxides, or the like may be used, but not particularly limited as long as the raw material is soluble in water.

Examples of the cobalt raw material may include Co(OH)$_2$, CoOOH, CoSO$_4$, Co(OCOCH$_3$)$_2$.4H$_2$O, Co(NO$_3$)$_2$.6H$_2$O, Co(SO$_4$)$_2$·7H$_2$O, and the like. Any one or a mixture of at least two thereof may be used.

In addition, the nickel raw material may include Ni(OH)$_2$, NiO, NiOOH, NiCO$_3$.2Ni(OH)$_2$.4H$_2$O, NiC$_2$O$_2$.2H$_2$O, Ni(NO$_3$)$_2$.6H$_2$O, NiSO$_4$, NiSO$_4$.6H$_2$O, fatty acid nickel salts, nickel halides, and the like. Any one or a mixture of at least two thereof may be used.

In addition, the manganese raw material may include manganese oxides such as Mn$_2$O$_3$, MnO$_2$, and Mn$_3$O$_4$; manganese salts such as MnCO$_3$, Mn(NO$_3$)$_2$, MnSO$_4$, manganese acetate, manganese dicarboxylate, manganese citrate and manganese fatty acid; oxy hydroxides; and manganese chloride. Any one or a mixture of at least two thereof may be used.

In addition, the aluminum raw material may include AlSO$_4$, AlCl, AlNO$_3$ and the like. Any one or a mixture of at least two thereof may be used.

In addition, the ammonium cation-containing complex-forming agent may specifically include NH$_4$OH, (NH$_4$)$_2$SO$_4$, NH$_4$NO$_3$, NH$_4$Cl, CH$_3$COONH$_4$, NH$_4$CO$_3$, and the like. One kind alone or a mixture of at least two kinds thereof may be used. Further, the ammonium cation-containing complex-forming agent may be used in the form of an aqueous solution. In this case, water or a mixture of water and an organic solvent (specifically an alcohol, etc.) mixable uniformly with water may be used as the solvent.

The ammonium cation-containing complex-forming agent may be added in such an amount that the molar ratio becomes 0.5 to 1 with respect to 1 mole of the metal-containing solution. Generally, a chelating agent reacts with a metal at a molar ratio of 1:1 or more to form a complex, but, in the formed complex, an unreacted complex which does react with a basic aqueous solution may be converted to an intermediate product, and recovered as the chelating agent and reused, so that the amount of the chelating agent used may be lowered in the present invention compared with the usual. As a result, the positive electrode active material may be improved in crystallinity and stabilized.

In addition, the basic compound may be alkali metals such as NaOH, KOH, and Ca(OH)$_2$, or hydroxides of alkaline earth metals, or hydrates thereof. One kind alone or a mixture of at least two kinds thereof may be used. The basic compound may also be used in the form of an aqueous solution. In this case, water, or a mixture of water and an organic solvent (Specifically an alcohol, etc.) capable of mixing with water uniformly may be used as a solvent.

In addition, a coprecipitation reaction for forming particles of the composite metal hydroxide may be performed under the condition of a pH being 11 to 13. When the pH falls outside the above range, the size of the prepared hydroxide may be changed, or the particle cleavage may be occurred. Further, metal ions may be eluted on the surface of the hydroxide to cause various kinds of oxides to be formed by a side reaction. More specifically, the coprecipitation reaction may be performed under the condition of a pH being 11 to 12.

In addition, the ammonium cation-containing complex-forming agent and the basic compound may be used at a molar ratio of 1:10 to 1:2 in order to satisfy the pH range. In this case, the pH value means the pH value of the liquid at 25° C.

In addition, the coprecipitaion reaction may be performed at a temperature of 40° C. to 70° C. under an inert atmosphere such as nitrogen. Also, a stirring process may be optionally performed in order to increase a reaction rate during the reaction. In this case, the stirring rate may be 100 rpm to 2,000 rpm.

Further, in the case of intending to form a concentration gradient of the metal element in the finally prepared positive electrode active material, the concentration gradient may be achieved by: preparing a second metal-containing solution including nickel, cobalt, M1-containing metal salts, and optionally M2-containing metal salts having different concentrations from those of the metal-containing solution; then adding the second metal-containing solution to the first metal-containing solution such that the mixing ratio of the metal-containing solution and the second metal-containing solution is gradually varied from 100 vol %:0 vol % to 0 vol %:100 vol %; and at the same time, adding an ammonium cation-containing complex-forming agent and a basic compound to the resultant mixture to trigger a reaction.

As described above, a composite metal hydroxide in which nickel, cobalt, and M1 respectively have concentration gradients in which the concentrations thereof independently change gradually from the center of the particle to the surface may be prepared through a single coprecipitation reaction process, by controlling the reaction rate and the reaction time while gradually increasing the amount of the second metal-containing solution added to the metal-containing solution. In this case, the concentration gradient and slop of the metal in the hydroxide produced may be readily controlled by the composition of the metal-containing solution and the second metal-containing solution and the mixing/supplying ratio therebetween. A high-density state in which the concentration of a specific metal is high may be obtained by lengthening a reaction time and lowering a reaction rate, and a low-density state in which the concentration of the specific metal is low may be obtained by shortening a reaction time and increasing a reaction rate.

Specifically, the second metal-containing solution may be added to the metal-containing solution at an addition rate of 1-30% of the initial addition rate while gradually increasing the rate. Specifically, the addition rate of the metal-containing solution may be 150 ml/hr to 210 ml/hr, the addition rate of the second metal-containing solution may be 120 ml/hr to 180 ml/hr, and the addition rate of the second metal-containing solution may be gradually increased within the range of 1% to 30% of the initial addition rate. In this case, the reaction may be performed at 40° C. to 70° C. Also, the sizes of precursor particles may be controlled by adjusting the amount of the second metal-containing solution supplied to the first metal-containing solution and the reaction time.

By the above process, a composite metal hydroxide particle, as a precursor, is generated and precipitated in the reaction solution. Specifically, the precursor may include a compound of Formula 4 below,

 [Formula 4]

(in Formula 4, M1, M2, M3, x, y, z, and w is as defined above).

In addition, the precipitated precursor may be separated according to conventional methods, and then a drying process may be optionally performed.

The drying process may be performed according to conventional drying methods. Specifically, the drying process may be performed by a heat treatment, hot-air injection, and the like in a temperature range of 100° C. to 200° C. for 15 to 30 hours.

Next, step 2 in the method for preparing the positive electrode active material is a step for preparing the first surface-treated layer including the oxide of Formula 2 on the core including the lithium composite metal oxide of Formula 1, by mixing the precursor particle prepared in step 1 with the lithium raw material, the M3 raw material, and optionally the M2 raw material, and firing the resultant mixture. In this case, the M2 raw material is the same as those described above.

In addition, the lithium raw material may include a lithium-containing carbonate (for example, lithium carbonate, etc.), a hydrate (for example, lithium hydroxide monohydrate ($LiOH \cdot H_2O$), etc.), a hydroxide (for example, lithium hydroxide, etc.), a nitrate (for example, lithium nitrate ($LiNO_3$), etc.), and a chloride (for example, lithium chloride (LiCl), etc.), and one kind alone or a mixture of at least two kinds thereof may be used. Also, the amount of the lithium-containing raw material used may be determined depending on the content of lithium and the content of transition metal in the lithium composite metal oxide finally produced, and specifically, may be used in such an amount that a molar ratio (a molar ratio of lithium/metal element (Me)) of the lithium included in a lithium raw material to the metal element (Me) included in a composite metal hydroxide becomes 1.0 or more.

In addition, acetates, nitrates, sulfates, halides, sulfides, hydroxides, oxides, oxyhydroxides, or the like, which include the M3 element may be used as the M3 raw material. As an example, when M3 is W, tungsten oxides, tungsten acids, or the like may be used. The M3 raw material may be used in such a range satisfying the content condition of the M3 element in the positive electrode active material finally produced.

Meanwhile, the firing process may be performed at 700° C. to 1,200° C. When the firing process is performed within the above temperature range, the first surface-treated layer including the lithium oxide of Formula 2 may be formed by the reaction of lithium on the core and the M4 element on the core surface. At the same time, the core having the above-mentioned physical properties including a crystal grain size may be formed. When a heat treatment temperature is less than 700° C., the lithium oxide of Formula 2 may be difficult to be formed; and when heat treatment temperature exceeds 1,200° C., by-products resulting from over-sintering may be generated.

In addition, the firing process may be performed in multiple steps within the temperature range described above, and the firing process may be performed while raising the temperature according to the progress of each step.

In addition, the firing process may be performed in an air atmosphere or an oxygen atmosphere (for example, $O_2$, etc.), and more specifically, in an oxygen atmosphere in which an oxygen partial pressure is 20 vol % or more. Also, the firing process may be performed under the above conditions for 5 hours to 48 hours, or for 10 hours to 20 hours.

In addition, sintering additives may be optionally further added during the firing process.

The addition of the sintering additives enables crystals to easily grow at a low temperature and a non-uniform reaction to be minimized during dry mixing. The sintering additives have the effect of dulling the edges of the primary particles of the lithium composite metal oxide to make round-curved particles. Generally, in a lithium oxide-based positive electrode active material including manganese, manganese is frequently eluted from the edge of the particle, and the characteristics of the secondary battery, particularly, the life characteristics at high temperature are degraded due to the elution of manganese. On the contrary, when the sintering additives are used, the manganese-eluted sites may be reduced by rounding the edges of the primary particles. As a result, the stability and life characteristics of the secondary battery may be improved.

Specifically, the sintering additives may include boron compounds such as boric acid, lithium tetraborate, boron oxide and ammonium borate; cobalt compounds such as cobalt oxide (II), cobalt oxide (III), cobalt oxide (IV) and cobalt tetraoxide; vanadium compounds such as vanadium oxide; lanthanum compounds such as lanthanum oxide; zirconium compounds such as zirconium boride, calcium zirconium silicate and zirconium oxide; yttrium compounds such as yttrium oxide; or gallium compounds such as gallium oxide, and any one or a mixture of at least two thereof may be used.

The sintering additives may be used in an amount of 0.2 parts by weight to 2 parts by weight, more specifically, 0.4 parts by weight to 1.4 parts by weight, based on 100 parts by weight of the precursor.

In addition, a moisture removing agent may be optionally further added during the firing process.

Specifically, examples of the moisture removing agent may include a citric acid, a tartaric acid, a glycolic acid, a maleic acid, and the like, and any one or a mixture of at least two thereof may be used. The moisture removing agent may be used in an amount of 0.01 to 2 parts by weight with respect to 100 parts by weight of the precursor.

The first surface-treated layer including the oxide of Formula 2 is formed on the core including the lithium composite metal oxide of Formula 1 by the process of step 2.

Next, in the method for preparing the positive electrode active material, step 3 is a step for preparing the positive electrode active material by forming the second surface-treated layer on the core on which the first surface-treated layer has been formed during step 2.

Specifically, the second surface-treated layer may be formed by using a composition including the lithium compound of formula 3 to perform a surface treatment on the core on which the first surface-treated layer has been formed during step 2.

The composition including the lithium compound of Formula 3 may be prepared by dispersing the lithium compound of Formula 3 in the solvent. In this case, the lithium compound of Formula 3 is the same as those described above.

In addition, examples of the solvent may include water, or alcohol having one to eight carbon atoms (such as methanol, ethanol, and isopropyl alcohol), or polar organic solvents such as dimethyl sulfoxide (DMSO), N-methylpyrrolidone (NMP), and acetone, and any one or a mixture of at least two thereof may be used. Also, the solvent may be included in such an amount that the composition may exhibit an appropriate coating property during the surface treatment, and also readily removed during the subsequent heat treatment.

In addition, the surface treatment using the composition may be performed by using conventional slurry coating methods such as coating, immersion, and spraying.

In addition, a heat treatment process may also be optionally further performed after the surface treatment.

The heat treatment process may be performed in a temperature range in which the solvent included in the composition may be removed, specifically, in a temperature range of 100° C. to 250° C. When the temperature is less than 100° C. during the heat treatment, side reactions may occur due to residual solvent components to cause the battery characteristics to be deteriorated; and when the temperature exceeds 250° C., side reactions may occur due to high-temperature heat.

In addition, an atmosphere for the heat treatment is not particularly limited and the heat treatment may be performed under vacuum, inert or atmospheric conditions.

In the positive electrode active material prepared by the above process, different kinds of surface-treated layers are formed to improve the capacity characteristics and output characteristics of the battery and to reduce the generation of gas. Also, when the distribution of the transition metal in the core is additionally controlled, as a result, thermal stability may be improved and the performance degradation at high voltage may be minimized.

Accordingly, according to another embodiment of the present invention, there is provided a positive electrode and a lithium secondary battery including the positive electrode active material.

Specifically, the positive electrode includes a positive electrode current collector, and a positive electrode active material layer formed on the positive electrode current collector and including the positive electrode active material.

The positive electrode current collector is not particularly limited as long as having conductivity without causing chemical changes in the battery. For example, stainless steel, aluminum, nickel, titanium, fired carbon or aluminum, or stainless steel surface-treated with carbon, nickel, titanium, silver, or the like may be used. Also, the positive electrode current collector may typically have a thickness of 3 to 500 μm, and fine irregularities may be formed on the current collector to increase the adhesive force of the positive electrode active material. For example, the positive electrode current collector may be used in various forms such as a film, a sheet, a foil, a net, a porous body, a foaming body, and a non-woven fabric, or the like.

Further, the positive electrode active material may include a conductive material and a binder together with the above-described positive electrode active material.

In this case, the conductive material is used for imparting conductivity to the electrode, and the conductive material may be used without particular limitation as long as having an electronic conductivity without causing chemical changes in the battery produced. Specific examples of the conductive material may include: graphite such as natural graphite or artificial graphite; carbonaceous materials such as carbon black, acetylene black, ketjen black, channel black, furnace black, lamp black, summer black, and carbon fiber; metal powders or metal fibers of copper, nickel, aluminum, silver or the like; conductive whiskers such as zinc oxide and potassium titanate; conductive metal oxides such as titanium oxide; or conductive polymers such as polyphenylene derivatives. One kind alone or at least two kinds of mixtures thereof may be used. The conductive material may be typically included in an amount of 1 to 30 wt % with respect to the total weight of the positive electrode active material layer.

In addition, the binder serves to improve adhesion between the positive electrode active material particles and an adhesive force between the positive electrode active material and the current collector. Specific examples of the binder may include polyvinylidene fluoride (PVDF), polyvinylidene fluoride-hexafluoropropylene copolymer (PVDF-co-HFP), polyvinyl alcohol, polyacrylonitrile, carboxymethylcellulose (CMC), starch, hydroxypropyl cellulose, regenerated celluloses, polyvinyl pyrrolidone, tetrafluoroethylene, polyethylene, polypropylene, ethylene-propylene-diene polymer (EPDM), sulfonated EPDM, styrene butadiene rubber (SBR), fluorine rubber, or various copolymers thereof, and one kind alone or a mixture of at least two kinds thereof may be used. The binder may be included in an amount of 1 to 30 wt %, based on the total weight of the positive electrode active material layer.

The positive electrode may be prepared by a conventional method for preparing the positive electrode except for using the positive electrode active material. Specifically, the positive electrode may be prepared by coating the positive electrode current collector with a positive electrode active material layer-forming composition including the positive electrode active material, and optionally including a binder and a conductive material, followed by drying and rolling. Here, types and contents of the positive electrode active material, the binder, and the conductive material are the same as those described above.

The solvent may be a solvent generally used in the art, and may be dimethyl sulfoxide (DMSO), isopropyl alcohol, N-methylpyrrolidone (NMP), acetone, water, or the like, and one kind alone or a mixture of at least two kinds thereof may be used. Considering the coating thickness of the slurry and the preparation yield, the amount of the solvent used may be sufficient if the solvent allows the positive electrode active material, the conductive material, and the binder to be dissolved and dispersed, and then has a viscosity at which excellent thickness uniformity is exhibited during coating for preparation of the positive electrode.

Alternatively, the positive electrode may also be prepared by casting the positive electrode active material layer-forming composition on a separate support, and then laminating a film peeled off from the support on the positive electrode current collector.

According to still another embodiment of the present invention, there is provided an electrochemical device including the positive electrode. The electrochemical device may be specifically a battery, a capacitor, or the like, and more specifically may be a lithium secondary battery.

The lithium secondary battery includes specifically a positive electrode, a negative electrode positioned facing the positive electrode, a separator interposed between the positive electrode and the negative electrode, and an electrolyte. The positive electrode is the same as that described above. The lithium secondary battery may optionally further include: a battery container for storing an electrode assembly composed of the positive electrode, the negative electrode, the separator; and a sealing member for sealing the battery container.

In the lithium secondary battery, the negative electrode includes a negative electrode current collector and a negative electrode active material layer positioned on the negative electrode current collector.

The negative electrode current collector is not particularly limited as long as having high conductivity without causing chemical change in the battery. For example, copper, stainless steel, aluminum, nickel, titanium, fired carbon, copper or stainless steel surface-treated with carbon, nickel, titanium, silver, and the like, and an aluminum-cadmium alloy may be used. Also, the negative electrode current collector may typically have a thickness of 3 to 500 µm, and as in the positive electrode current collector, fine irregularities may be formed on the surface of the current collector to enhance the binding force of the negative electrode active material. For example, the negative electrode current collector may be used in various forms such as a film, a sheet, a foil, a net, a porous body, a foaming body, and a nonwoven fabric.

The negative electrode active material layer optionally includes a binder and a conductive material together with the negative electrode active material. As an example, the negative electrode active material layer may be prepared: by coating and drying a negative electrode-forming composition including the negative electrode active material, and optionally including a binder and a conductive material on the negative electrode current collector; or by casting the negative electrode-forming composition on a separate support, and then by laminating a film peeled off from the support on the negative electrode current collector.

As the negative electrode active material, a compound capable of reversible intercalation and deintercalation of lithium may be used. Specific examples of the negative electrode active material may include: carbonaceous materials such as artificial graphite, natural graphite, graphitized carbon fiber, or amorphous carbon; metallic compounds capable of being alloyed with lithium (e.g., Si, Al, Sn, Pb, Zn, Bi, In, Mg, Ga, Cd, Si alloys, Sn alloys, or Al alloys); metal oxides capable of doping and dedoping lithium (e.g., $SiO_x$ (0<x<2), $SnO_2$, vanadium oxide, or lithium vanadium oxide);

and composites including the metallic compound and the carbonaceous material (e.g., Si—C composite or Sn—composite). Any one or a mixture of at least two thereof may be used. Also, metal lithium thin film may be used as the negative electrode active material. Furthermore, as the carbonaceous material, both low-crystalline carbon and high-crystalline carbon may be used. Typical examples of the low-crystalline carbon include soft carbon and hard carbon, and typical examples of the high-crystalline carbon include natural graphite or artificial graphite having an amorphous, plate-like, flake, spherical, or fiber form; and high-temperature fired carbon such as Kish graphite, pyrolytic carbon, mesophase pitch based carbon fiber, meso-carbon microbeads, mesophase pitches, and petroleum or coal tar pitches derived cokes.

In addition, the binder and the conductive material may be the same as those described above for the positive electrode.

Meanwhile, in the lithium secondary battery, the separator separates the negative electrode and the positive electrode, and provides the migration passage for lithium ions. The separator may be used without particularly limitation as long as being conventionally used as a separator in the lithium secondary battery. Particularly, the separator may have a low resistance against the migration of ions in the electrolyte and an excellent ability to contain the electrolyte. Specifically, the separator may use: a porous polymer film, for example, a porous polymer film made of a polyolefin-based polymer such as an ethylene homopolymer, a propylene homopolymer, an ethylene/butene copolymer, an ethylene/hexene copolymer and an ethylene/methacrylate copolymer; or a laminated structure having at least two layers thereof. Also, a typical porous non-woven fabric made of, for example, a high-melting point glass fiber, a polyethylene terephthalate fiber, and the like may be used as the separator. Also, in order to ensure a heat resistance and a mechanical strength, a coated separator containing a ceramic component or a polymer material may be used, and may be optionally used as a single layer or multilayer structure.

In addition, examples of the electrolyte used in the present invention may include an organic liquid electrolyte, an inorganic liquid electrolyte, a solid polymer electrolyte, a gel polymer electrolyte, a solid inorganic electrolyte, a molten inorganic electrolyte, and the like used as an electrolyte in the lithium secondary battery, but not limited thereto.

Specifically, the electrolyte may include an organic solvent and a lithium salt.

An organic solvent may be used without any particular limitation as long as being capable of serving as a medium through which ions involved in the electrochemical reaction of the battery may migrate. Specifically, examples of the organic solvent may include ester-based solvents such as methyl acetate, ethyl acetate, γ-butyrolactone and ε-caprolactone; ether-based solvents such as dibutyl ether or tetrahydrofuran; ketone-based solvents such as cyclohexanone; aromatic hydrocarbon-based solvents such as benzene and fluorobenzene; carbonate-based solvents such as dimethylcarbonate (DMC), diethylcarbonate (DEC), methylethylcarbonate (MEC), ethylmethylcarbonate (EMC), ethylene carbonate (EC), and propylene carbonate (PC); alcohol-based solvents such as ethyl alcohol and isopropyl alcohol; nitriles such as R—CN (R is a straight, branched, or cyclic hydrocarbon group of C2 to C20, which may include a double bond aromatic ring or ether bond); amides such as dimethylformamide; dioxolanes such as 1,3-dioxolane; and sulfolane. From among the solvent described above, the carbonate-based solvent is desirably used, and more desirably, a mixture of a cyclic carbonate (e.g., ethylene carbonate or propylene carbonate, etc.) which has a high ionic conductivity and a high dielectric constant and is thus capable of improving the charging/discharging performance of the battery and a linear carbonate-based compound (e.g., ethyl methyl carbonate, dimethyl carbonate, diethyl carbonate, etc.) having a low viscosity is used. In this case, the use of a mixture of a cyclic carbonate and linear chain carbonate at a volume ratio of about 1:1 to about 1:9 may be advantageous in the performance of the electrolytic solution.

The lithium salt may be used without any particular limitation as long as being a compound capable of providing lithium ions used in the lithium secondary battery. Specifically, examples of the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, and $LiB(C_2O_4)_2$. The concentration of the lithium salt may be used in the range of 0.1 to 2.0 M. When the concentration of the lithium salt is in the above range, the electrolyte may have an appropriate conductivity and viscosity to exhibit excellent electrolyte performance, and lithium ions may effectively migrate.

In addition to the electrolyte components, the electrolyte may further include one or more additives for the purpose of improving the life characteristics of the battery, suppressing the reduction of the battery capacity, and improving the discharge capacity of the battery. Examples of the additives for the purpose above may be haloalkylene carbonate-based compounds (e.g., difluoroethylene carbonate), pyridine, triethylphosphite, triethanolamine, cyclic ether, ethylene diamine, n-glyme, hexaphosphoric triamide, nitrobenzene derivatives, sulfur, quinoneimine dyes, N-substituted oxazolidinones, N,N-substituted imidazolidine, ethylene glycol dialkyl ether, ammonium salt, pyrrole, 2-methoxy ethanol or aluminum trichloride, etc. In this case, the additives may be included in an amount of 0.1 to 5% by weight, based on the total weight of the electrolyte.

As described above, the lithium secondary battery including the positive electrode active material according to the present invention stably exhibits excellent discharge capacity, output characteristics, and capacity retention rate, and thus being useful for mobile devices such as a mobile phone, a laptop computer, and a digital camera, and for electric vehicles such as a hybrid electric vehicle (HEV).

Thus, according to another embodiment of the present invention, there is provided a battery module including the lithium secondary battery as a unit cell, and a battery pack including the same.

The battery module and the battery pack may be used as a power tool; an electric vehicle (EV) including an electric vehicle (EV), a hybrid electric vehicle, and a plug-in hybrid electric vehicle (PHEV); and any one or more medium-large device power source of a system for power storage.

MODE FOR CARRYING OUT THE INVENTION

Hereinafter, examples of the present invention will be described in detail in such a manner that it may easily be carried out by a person with ordinary skill in the art to which the present invention pertains. The invention may, however, be embodied in many different forms and should not be construed as being limited to the examples set forth herein.

Example 1-1: Preparation of Positive Electrode Active Material

In a batch type 5 L reactor set to 60° C., nickel sulfate, cobalt sulfate, manganese sulfate were mixed in water at a molar ratio of 60:20:20 to prepare a metal-containing solution of 2M concentration. A container including the metal-containing solution is connected to allow the solution to be introduced into the reactor, and a 4M NaOH solution and a 7% NH$_4$OH aqueous solution were prepared and respectively connected to the reactor. 3 liters of deionized water was added to a coprecipitation reactor (capacity: 5 L), and nitrogen gas was purged into the reactor at a rate of 2 liters/min to remove dissolved oxygen in the water, and the inside of the reactor was set up to be in a non-oxidizing atmosphere. Thereafter, 100 ml of 4 M NaOH was added, and maintained such that the pH became 12.0 while stirring at a stirring rate of 1,200 rpm at 60° C. Then, a metal-containing solution, a NaOH aqueous solution, and a NH$_4$OH aqueous solution were added at a rate of 180 ml/hr, 180 ml/hr, and 10 ml/hr, respectively, and reacted for 24 hours to form a hydroxide including a nickel manganese cobalt-based composite metal as a precursor.

The resultant precursor was mixed with a lithium hydroxide as a lithium raw material and a tungsten (IV) oxide at a molar ratio of 1:1.07:0.005, and then fired at 850° C. for 20 hours in an oxygen atmosphere (oxygen partial pressure 20%) to thereby prepare a core (LiNi$_{0.6}$Mn$_{0.2}$Co$_{0.2}$O$_2$W$_{0.005}$—Li$_m$WO$_{(m+n)/2}$) having a first surface-treated layer including a lithium tungsten oxide of Li$_2$WO$_4$ and Li$_4$WO$_5$.

With respect to 100 parts by weight of the core having the first surface-treated layer formed thereon, 0.1 parts by weight of H$_3$BO$_3$ was mixed with isopropyl alcohol, and the resultant composition was surface-treated and heat-treated at 250° C. for 1 hour in the atmosphere. Through this process above, a positive electrode active material in which a second surface-treated layer including LiBO$_2$ and Li$_2$B$_4$O$_2$ was formed on the outermost periphery of the active material was prepared.

Example 1-2: Preparation of Positive Electrode Active Material

In a batch type 5 L reactor set to 60° C., nickel sulfate, cobalt sulfate, and manganese sulfate were mixed in water at a molar ratio of 80:10:10 to prepare a first metal-containing solution of 2M concentration, and nickel sulfate, cobalt sulfate, and manganese sulfate were mixed in water at a molar ratio of 40:30:30 to prepare a second metal-containing solution of 2M concentration. The container including the first metal-containing solution was connected to allow the first metal-containing solution to be introduced into the reactor, and the container including the second metal-containing solution was connected to allow the second metal-containing solution to be introduced into the first metal-containing container. Further, a 4M NaOH solution and a 7% NH$_4$OH aqueous solution were prepared and respectively connected to the reactor.

3 liters of deionized water was added to a coprecipitation reactor (capacity 5 L), and then nitrogen gas was purged at a rate of 2 liters/min to the reactor to remove dissolved oxygen in the water, and the inside of the reactor was set up to be in a non-oxidized atmosphere. Thereafter, 100 ml of 4M NaOH was added, and maintained such that the pH became 12.0 while stirring at a stirring rate of 1,200 rpm at 60° C. Then, a first metal salt, a NaOH aqueous solution, and a NH$_4$OH aqueous solution were added at a rate of 180 ml/hr, 180 ml/hr, and 10 ml/hr, respectively, and reacted for 30 minutes to form a hydroxide seed of the first metal-containing solution. Thereafter, the pH was lowered at a rate of pH 2 per hour to change the pH to 9.5, and at the same time, the second metal-containing solution was added to the container of the first metal-containing solution at a rate of 150 ml/hr to induce a concentration gradient inside the particle while inducing the growth of hydroxide particles. Then, the reaction was maintained for 24 hours to prepare a precursor by growing a nickel manganese cobalt-based composite metal hydroxide.

The resultant precursor was mixed with the lithium hydroxide as the lithium raw material and tungsten (IV) oxide at a molar ratio of 1:1.07:0.005, and then fired for 20 hours at 900° C. in an oxygen atmosphere (oxygen partial pressure 20%) to thereby obtain a core (LiNi$_{0.6}$Mn$_{0.2}$Co$_{0.2}$W$_{0.005}$O$_2$—Li$_m$WO$_{(m+n)/2}$) having a first surface-treated layer including lithium tungsten oxides of Li$_2$WO$_4$, Li$_4$WO$_5$, and Li$_6$WO$_6$.

The positive electrode active material was prepared in the same manner as in Example 1-1 except for using the obtained core.

In addition, the X-ray photoelectron spectroscopic analysis for the prepared positive electrode active material demonstrated that in the core, nickel had a concentration gradient in which the nickel concentration decreases from the center of the core particle toward the surface thereof; manganese and cobalt had concentration gradients in which the respective concentrations thereof increase from the center of the particle toward the surface of the particle; and tungsten was doped with a concentration gradient in which the tungsten concentration decreases from the surface of the core toward the center of the particle.

Examples 1-3 to 1-5: Preparation of Positive Electrode Active Material

The positive electrode active material was prepared in the same manner as in the example 1-1, except that the belowlisted amounts of the materials shown in Table 1 below was used as the first and second surface-treated layer-forming materials in Example 1-1.

TABLE 1

| Classification | First surface-treated layer-forming raw material | Amount used (W-based molar ratio) | Second surface-treated layer-forming raw material | Amount used (parts by weight based on 100 parts by weight of core) |
|---|---|---|---|---|
| Example 1-1 | Tungsten (IV) oxide ($WO_2$) | 0.005 | $H_3BO_3$ | 0.1 |
| Example 1-2 | Tungsten (IV) oxide ($WO_2$) | 0.005 | $H_3BO_3$ | 0.1 |
| Example 1-3 | Tungsten (IV) oxide ($WO_2$) | 0.005 | $H_3BO_3$ | 0.05 |
| Example 1-4 | Molybdenum (IV) oxide($MoO_2$) | 0.005 | $SiO_2$ | 0.05 |
| Example 1-5 | Chrome(III) oxide ($Cr_2O_3$) | 0.005 | $HBPO_4$ | 0.05 |

Comparative Example 1-1: Preparation of Positive Electrode Active Material

In a batch type 5 L reactor set to 60° C., nickel sulfate, cobalt sulfate, and manganese sulfate were mixed in water at a molar ratio of 60:20:20 to prepare a metal-containing solution of 2M concentration. A container including a first metal-containing solution was connected to allow the solution to be introduced into the reactor, and a 4M NaOH solution and a 7% $NH_4OH$ aqueous solution were prepared and respectively connected to the reactor, respectively. 3 liters of deionized water was added to a coprecipitation reactor (capacity: 5 L), and nitrogen gas was purged to the reactor at a rate of 2 liters/min to remove oxygen dissolved in water, and the inside of the reactor was set to be in a non-oxidized atmosphere. Thereafter, 100 ml of 4M NaOH was added and then maintained such that the pH became 12.0 while stirring at a stirring rate of 1,200 rpm at 60° C. Then, the metal-containing solution, a NaOH aqueous solution, and a $NH_4OH$ aqueous solution were added at a rate of 180 ml/hr, 180 ml/hr, and 10 ml/hr, respectively, and reacted for 24 hours to form nickel manganese cobalt-based composite metal hydroxide.

The resultant nickel manganese cobalt-based composite metal hydroxide particles were mixed with a lithium hydroxide as a lithium raw material at a molar ratio of 1:1.07, and then heat-treated for 20 hours at 950° C. in an oxygen atmosphere (oxygen partial pressure: 20%) to prepare a positive electrode active material ($LiNi_{0.6}Mn_{0.2}Co_{0.2}O_2$).

Comparative Example 1-2: Preparation of Positive Electrode Active Material

The precursor was prepared in the same manner as described in the preparation of the positive electrode active material in Example 1-1, except that lithium hydrate, tungsten oxide ($WO_3$) and boron oxide ($H_3BO_3$) as raw materials were simultaneously mixed through a solid phase process at a weight ratio of 1:1, and then fired at 750° C. for 15 hours in an oxygen atmosphere to prepare a surface-treated layer ($LiNi_{0.6}Mn_{0.2}Co_{0.2}O_2$—$Li_mWO_{(m+n/2)}$—$Li_pB_qO_r$) including $Li_2WO_4$, $Li_4WO_5$, $LiBO_2$ and $Li_2B_4O_7$.

Examples 2-1 to 2-5, and Comparative Examples 2-1 and 2-2: Preparation of Lithium Secondary Battery A lithium secondary battery was prepared by using each of the positive electrode active materials prepared in Examples 1-1 to 1-5 and Comparative Examples 1-1 and 1-2, respectively.

Specifically, each of the positive electrode active materials prepared in Examples 1-1 to 1-5 and Comparative Examples 1-1 and 1-2, a carbon black conductive material and a PVDF binder were mixed in an N-methylpyrrolidone solvent at a weight ratio of 95:2.5:2.5 to obtain a positive electrode-forming composition (viscosity: 5,000 mPa·s), and this composition was applied onto an aluminum current collector, then dried at 130° C., and thereafter rolled to prepare a positive electrode.

Also, as a negative electrode active material, natural graphite, a carbon black conductive material, and a PVDF binder were mixed in an N-methylpyrrolidone solvent at a weight ratio of 85:10:5 to obtain a negative electrode-forming composition. This composition was then applied onto a copper current collector to prepare a negative electrode.

An electrode assembly was prepared by interposing a porous polyethylene separator between the positive electrode and the negative electrode prepared as described above, and the electrode assembly was positioned inside the case. Thereafter, an electrolyte solution was introduced into the case to produce a lithium secondary battery. In this case, the electrolytic solution was prepared by dissolving 1.0 M lithium hexafluorophosphate ($LiPF_6$) in an organic solvent composed of ethylene carbonate/dimethyl carbonate/ethyl-methyl carbonate (mixed volume ratio of EC/DMC/EMC=3/4/3).

Experimental Example 1: Observation of Structure of Positive Electrode Active Material The positive electrode active material prepared in Example 1-1 was processed by ion milling and then observed by using a field emission scanning electron microscopy (FE-SEM). As a result, the thicknesses and volumes of the core and the first and second surface-treated layers, and the ratio therebetween in the active material were calculated. The results are shown in Table 2 below.

TABLE 2

| Classification | Radius or thickness (μm) | Volume (μm$^3$) | Ratio (%) |
|---|---|---|---|
| Core | 8.00 | 2144.6 | 97.1 |
| First surface-treated layer | 0.05 | 40.5 | 1.8 |
| Second surface-treated layer | 0.03 | 24.5 | 1.1 |
| Total | 8.08 | 2209.6 | 100 |

From the observation results of the cross-sectional structure, the surface-treated layer formed on the core surface could be confirmed. In addition, the prepared positive electrode active material had a total particle diameter of 16.16 μm, and, when the radius of the positive electrode active material was 8.08 μm, the radius of the core was 8 μm, the thickness of the first surface-treated layer was 0.05 μm, and the thickness of the second surface-treated layer was 0.03 μm.

As a result of measuring a BET specific surface area and a tap density, the positive electrode active material prepared in Example 1-1 had a BET specific surface area of 0.62 m²/g and a tap density of 2.1 g/cc. The BET specific surface area of the positive electrode active material was calculated from an amount of nitrogen gas adsorbed at a liquid nitrogen temperature (77 K) using BELSORP-mino II (manufactured by BEL Japan Inc.). The tap density was measured by using a powder tester manufactured by Seishin company.

Experimental Example 2: Evaluation of Positive Electrode Active Material

A coin half cell (use of negative electrode of Li metal) prepared by using the positive electrode active materials prepared in Examples 1-1 to 1-3 and Comparative Examples 1-1 and 1-2 was charged at 25° C. until a voltage reached 4.25 V at a constant current (CC) of 0.1 C, and then charged at a constant voltage (CV) of 4.25 V to perform a first time charge until the charge current became 0.05 mAh. Thereafter, the cell was left standing for 20 minutes and discharged until a voltage reached 3.0 V at a constant current of 0.1 C to measure the discharge capacity at the first cycle. Then, the charge/discharge capacity, charge/discharge efficiency and rate characteristics were each evaluated by changing the discharge condition to a 2 C rate. The results are shown in Table 3 below.

TABLE 3

| | First charge/discharge | | | 2 C rate | |
|---|---|---|---|---|---|
| Classification | Charge capacity (mAh/g) | Discharge capacity (mAh/g) | Charge-discharge efficiency (%) | Capacity (mAh/g) | 2.0 C/ 0.1 C (%) |
| Example 1-1 | 192.5 | 169.7 | 88.2 | 154.8 | 91.2 |
| Example 1-2 | 192.7 | 171.4 | 88.9 | 159.1 | 92.8 |
| Example 1-3 | 192.4 | 170.6 | 88.7 | 156.4 | 91.7 |
| Comparative Example 1-1 | 193.1 | 168.9 | 87.5 | 151.7 | 89.8 |
| Comparative Example 1-2 | 192.5 | 169.2 | 87.9 | 153.3 | 90.6 |

As a result of the experiments, the coin half cell including each of the positive electrode active materials of Examples 1-1 to 1-3 exhibited effects more improved than those of the coin half cell including each of the positive electrode active material of Comparative Example 1-1 and Comparative Example 1-2, in terms of charge/discharge efficiency, rate characteristics, and capacity characteristics.

Experimental Example 3: Evaluation of Battery Characteristics of Lithium Secondary Battery The lithium secondary battery (Examples 2-1 to 2-3, Comparative Examples 2-1 and 2-2) including each of the positive electrode active materials of Examples 1-1 to 1-3 and Comparative Examples 1-1 and 1-2 was evaluated for the battery characteristics in the following method.

Specifically, charging/discharging was performed 300 times on the lithium secondary battery at 45° C. in a driving voltage range of 2.8 V to 4.15 V under the condition of 1 C/2 C.

As a result, each cycle capacity retention, which is a ratio of a discharge capacity at a 300$^{th}$ cycle to an initial capacity after charging/discharging was performed 300 times at a high temperature, was measured, and is shown in Table 4 below.

TABLE 4

| Classification | 300-cycle capacity retention (%) at high temperature (45° C.) |
|---|---|
| Example 2-1 | 92.7 |
| Example 2-2 | 90.4 |
| Example 2-3 | 91.3 |
| Comparative Example 2-1 | 85.8 |
| Comparative Example 2-2 | 87.6 |

As a result of the experiments, it can be observed that the lithium secondary battery using each of the positive electrode active materials prepared in Example 2-1 to 2-3 had better cycle characteristics at a high temperature than the lithium secondary batteries of Comparative Example 2-1 and 2-2.

Experimental Example 4: Measurement of Gas Generation Amount of Lithium Secondary Battery The lithium secondary batteries (Examples 2-1 to 2-3 and Comparative Examples 2-1 to 2-3) including the positive electrode active materials in Examples 1-1 to 1-3 and Comparative Examples 1-1 and 1-2 were charged to 4.15 V at a constant current of 0.1 C, and then stored at 60° C. for one week to measure an oxygen gas generation amount.

Specifically, the battery was submerged in liquid paraffin, and the oxygen gas generation amount (volume) was measured from a difference in a liquid level between before and after the charge/discharge. The results are shown in Table 5 below.

TABLE 5

| Classification | Gas generation amount (mL) |
|---|---|
| Example 2-1 | 1.20 |
| Example 2-2 | 1.17 |
| Example 2-3 | 1.60 |
| Comparative Example 2-1 | 2.90 |
| Comparative Example 2-2 | 2.51 |

As a result of the experiments, the lithium secondary batteries of Example 2-1 to 2-3 including the positive electrode active material according to the present invention had significantly smaller gas generation amount than the lithium secondary batteries of Comparative Examples 2-1 to 2-4.

What is claimed is:

1. A method for preparing a positive electrode active material for a secondary battery, the method comprising:
preparing a precursor by reacting a nickel raw material, a cobalt raw material and an M1 raw material, wherein M1 is at least any one element selected from the group consisting of Al and Mn;
forming a first surface-treated layer including an oxide of Formula 2 below, on a surface of a core including a lithium composite metal oxide of Formula 1 below, by mixing the precursor with a lithium raw material and an M3 raw material, wherein M3 is any one or at least two elements selected from the group consisting of W, Mo and Cr, and firing the resultant mixture; and forming a second surface-treated layer including a lithium compound of Formula 3 below, on the core with the first surface-treated layer formed thereon, $$Li_aNi_{1-x-y}Co_xM1_yM3_zM2_wO_2 \quad [\text{Formula 1}]$$

wherein, in Formula 1, M1 is at least any one selected from the group consisting of Al and Mn, M2 is any one or at least two elements selected from the group consisting of Zr, Ti, Mg, Ta and Nb, and M3 is any one or at least two elements selected from consisting of W, Mo, and Cr, and $1.0 \leq a \leq 1.5$, $0 < x \leq 0.5$, $0 < y \leq 0.5$, $0.002 \leq z \leq 0.03$, $0 \leq w \leq 0.02$, $0 < x+y \leq 0.7$), $$Li_mM4O_{(m+n)/2} \quad [\text{Formula 2}]$$

wherein, in Formula 2, M4 is any one or at least two elements selected from the group consisting of W, Mo, and Cr, and $2 \leq m \leq 6$, and n is an oxidation number of M4), $$Li_pM5_qA_r \quad [\text{Formula 3}]$$

wherein, in Formula 3, M5 is any one or at least two elements selected from the group consisting of elements in Group 13 to Group 15, A is any one selected from the group consisting of O, OH, $CO_3$, $PO_4$, F, and $SO_4$, and $1 \leq p \leq 10$, $1 \leq q \leq 10$, $r=(p+s)/t$ where s is the absolute value of an oxidation number of M5 and t is the absolute value of an oxidation number of A.

2. The method of claim 1, wherein the preparing of the precursor is performed through reaction by adding an ammonium cation-containing complexing agent and a basic compound into a metal-containing solution which is obtained by mixing a nickel raw material, a cobalt raw material, and an M1 raw material.

3. The method of claim 2, wherein an additional metal-containing solution including nickel, cobalt, M1, and M3, in concentrations of which are different from those in the metal-containing solution, is further added to the metal-containing solution.

4. The method of claim 1, wherein the lithium raw material is used such that a molar ratio (molar ratio of lithium/metal element) of lithium included in the lithium raw material and a metal element included in the precursor is 1.0 or more.

5. The method of claim 1, wherein the firing is performed at a temperature of 700° C. to 1,200° C.

6. The method of claim 1, wherein the firing is performed in an atmosphere of air or oxygen.

7. The method of claim 1, wherein the forming of the second surface-treated layer comprises performing surface-treatment on the core with the first surface-treated layer formed thereon, by using a composition including the lithium compound of Formula 3, and then performing heat treatment.

* * * * *